(12) United States Patent
Wilshaw

(10) Patent No.: US 10,400,679 B2
(45) Date of Patent: Sep. 3, 2019

(54) CONNECTION OF ROTATABLE PARTS

(71) Applicant: ROLLS-ROYCE plc, London (GB)

(72) Inventor: Johnathan H. Wilshaw, Barlaston (GB)

(73) Assignee: ROLLS-ROYCE PLC, London (GB)

( * ) Notice: Subject to any disclaimer, the term of this patent is extended or adjusted under 35 U.S.C. 154(b) by 303 days.

(21) Appl. No.: 15/417,584

(22) Filed: Jan. 27, 2017

(65) Prior Publication Data

US 2017/0241348 A1    Aug. 24, 2017

(30) Foreign Application Priority Data

Feb. 18, 2016  (GB) .................................. 1602857.3

(51) Int. Cl.
*F01D 5/06* (2006.01)
*F02C 7/36* (2006.01)
(Continued)

(52) U.S. Cl.
CPC .................. *F02C 7/36* (2013.01); *F01D 5/02* (2013.01); *F01D 5/022* (2013.01); *F01D 5/023* (2013.01); *F01D 5/06* (2013.01); *F01D 5/066* (2013.01); *F02C 3/04* (2013.01); *F02K 3/06* (2013.01); *F04D 29/054* (2013.01); *F04D 29/321* (2013.01); *F04D 29/644* (2013.01); *F05D 2220/32* (2013.01); *F05D 2230/60* (2013.01); *F05D 2230/64* (2013.01); *F05D 2240/60* (2013.01); *F05D 2260/30* (2013.01)

(58) Field of Classification Search
CPC . F01D 5/06; F01D 5/063; F01D 5/066; F01D 5/02; F01D 5/022; F01D 5/023; F02C 7/36; F02C 3/04; F02K 3/06; F04D 29/054; F04D 29/321; F04D 29/644; F05D 2220/32; F05D 2230/60; F05D 2230/64; F05D 2240/60; F05D 2260/30
See application file for complete search history.

(56) References Cited

U.S. PATENT DOCUMENTS 3,713,676 A * 1/1973 Carlstrom ............... F01D 5/025
                                                    403/28
3,888,602 A * 6/1975 Nichols ..................... F01D 5/06
                                                    416/198 A
(Continued)

FOREIGN PATENT DOCUMENTS

| EP | 1178231 | 2/2002 |
| EP | 2677120 | 12/2013 |
| GB | 1366560 | 9/1974 |

OTHER PUBLICATIONS

GB Search Report dated Sep. 13, 2016 issued in GB Patent Application No. 1602857.3.
(Continued)

*Primary Examiner* — Richard A Edgar
(74) *Attorney, Agent, or Firm* — Oliff PLC

(57) ABSTRACT

A gas turbine engine has two connected parts that rotate together during use. The two parts have a tensile loading that acts to separate the two parts in use. The two parts may be neighbouring rotating stages of a gas turbine engine. The two parts are connected together using both a mechanical fastener and an interlocking feature. The interlocking feature may be, for example, interlocking conical surfaces and/or interlocking protrusions.

13 Claims, 3 Drawing Sheets

(51) Int. Cl.
　　　*F01D 5/02*　　　(2006.01)
　　　*F02C 3/04*　　　(2006.01)
　　　*F02K 3/06*　　　(2006.01)
　　　*F04D 29/054*　(2006.01)
　　　*F04D 29/32*　　(2006.01)
　　　*F04D 29/64*　　(2006.01)

(56) References Cited

U.S. PATENT DOCUMENTS

| | | | |
|---|---|---|---|
| 4,804,288 A | 2/1989 | Tiernan, Jr. | |
| 9,360,029 B2* | 6/2016 | Wallace | F16B 2/00 |
| 2010/0158699 A1 | 6/2010 | Makuszewski | |
| 2010/0166546 A1 | 7/2010 | Mahan et al. | |
| 2013/0302163 A1* | 11/2013 | Wilson | F01D 5/025 |
| | | | 416/1 |
| 2014/0099210 A1 | 4/2014 | Miller | |

OTHER PUBLICATIONS

EP Search Report dated Jul. 12, 2017 issued in EP Patent Application No. 17152090.

* cited by examiner

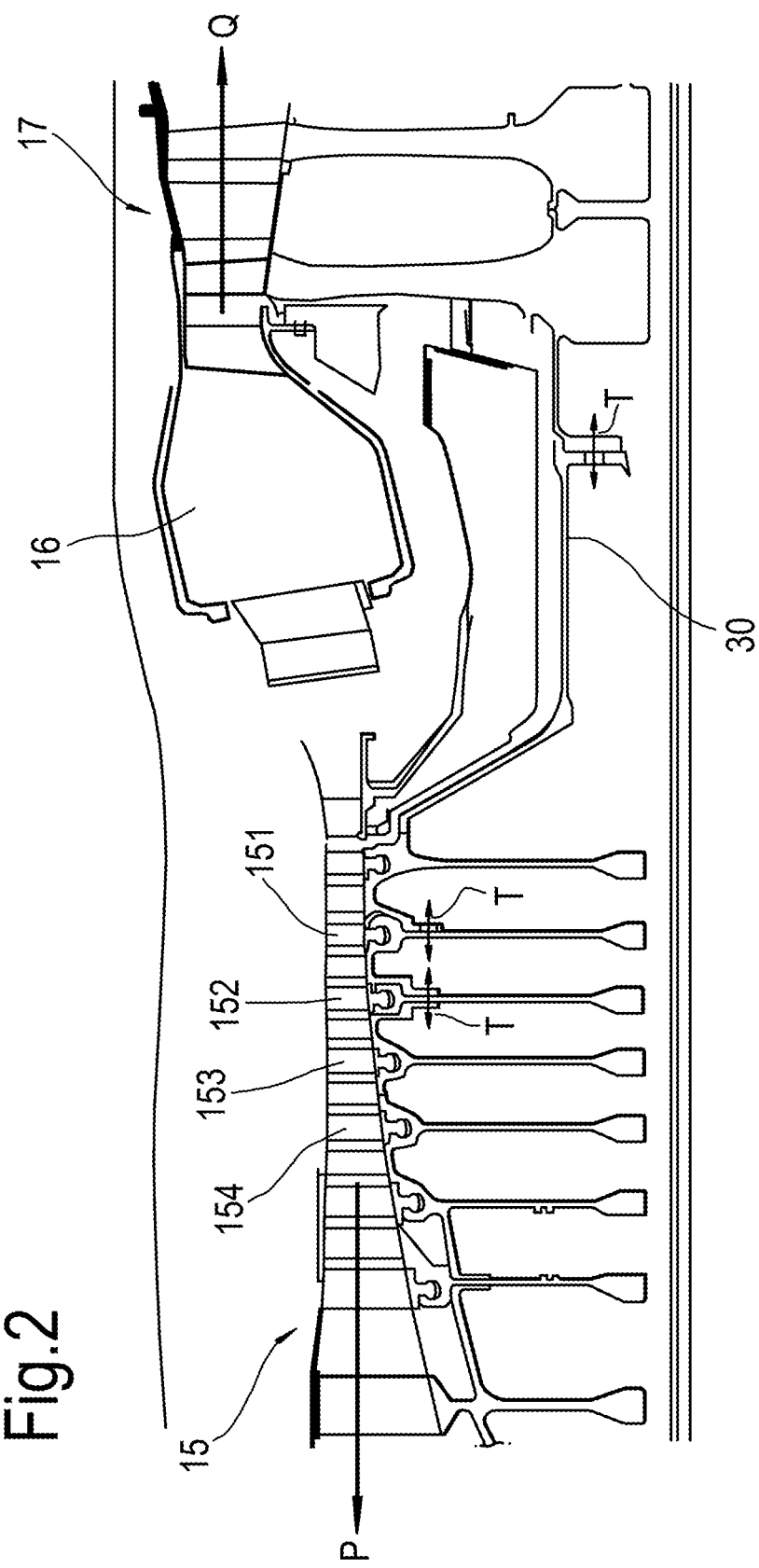

CONNECTION OF ROTATABLE PARTS

CROSS-REFERENCE TO RELATED APPLICATIONS

This application is based upon and claims the benefit of priority from British Patent Application Number 1602857.3 filed 18 Feb. 2016, the entire contents of which are incorporated by reference.

BACKGROUND

1. Field of the Disclosure

The present disclosure relates to fixing two rotatable parts together. Aspects of the present disclosure relate to fixing two rotatable parts of a gas turbine engine together.

2. Description of the Related Art

An axial-flow gas turbine engine comprises a compressor, a combustor and a turbine. As the flow passes through the compressor, the pressure increases, resulting in a net forward force on the compressor. As the flow passes through the turbine, the pressure decreases, resulting in a net rearward force on the turbine.

A typical compressor comprises multiple stages, each one of which has a set of rotor blades provided at a given axial location. In use, multiple stages of rotor blades typically all rotate at the same axial rate. Furthermore, these rotor blade stages also rotate at the same axial rate as one or more corresponding rotor blade stages of the turbine.

The compressor and turbine are typically joined by a shaft. The shaft transmits power from the turbine to the compressor. Accordingly, the shaft, multiple compressor stages and one or more turbine stages all rotate at the same rate in use.

Turning to the compressor stages, one way of ensuring that each compressor stage rotates at the same rate is to machine the parts of each stage that hold the blades (for example the rotor discs) and their connecting parts from a single metallic block. However, this is expensive, and limits the design freedom as it requires all stages to be manufactured using the same material. This may not be desirable because the different flow conditions (for example in terms of temperature and/or pressure) experienced by each of the stages may mean that different materials are best suited to for the different stages.

If the stages are not to be machined from a single block, then the individual rotor stages must be held together. However, due to the pressure increase through a compressor, there is very significant axial force pushing neighbouring rotor stages axially apart. Thus, it may not be feasible and/or desirable to attach neighbouring rotor stages together using conventional means, particularly for engines that have high pressure rises across the compressor. For example, such conventional means may be required to be unacceptably large and/or heavy.

Similarly, due to the pressure decrease through the turbine, it may not be feasible to attach neighbouring rotor stages of a turbine together using conventional means. Furthermore, it may not be feasible and/or desirable to attach a part of the shaft (that connects the turbine and compressor together) either to another part of the shaft or to a part of the compressor or turbine using conventional means.

OBJECTS AND SUMMARY

Accordingly, it is desirable to be able to provide an improved rotating gas turbine engine structure, for example having improved design freedom and/or reduced cost and/or reduced weight and/or reduced size.

According to an aspect, there is provided a gas turbine engine having a first rotatable part and a second rotatable part. Each of the first and second rotatable parts is rotatable about a rotational axis wherein. The first rotatable part and the second rotatable part are fixed together using a primary joining mechanism and a secondary joining mechanism. The primary joining mechanism is a mechanical fastener. The secondary joining mechanism is an interlocking feature. The first and second rotatable parts are engaged through the interlocking feature such that relative axial movement of the first and second rotatable parts is resisted by the interlocking feature.

According to an aspect, there is provided a method of fixing a first rotatable part and a second rotatable part of a gas turbine engine together. The method comprises mechanically fastening the first and second rotatable parts together using a mechanical fastener. The method comprises interlocking the first rotatable part and the second rotatable part together using an interlocking feature. The interlocking may provide (at least) resistance to relative axial movement of the first and second rotatable parts.

According to an aspect, there is provided a method of manufacturing a gas turbine engine comprising the step of fixing the first and second rotatable parts together as described and/or claimed herein.

The first and second rotatable parts may be said to be directly fixed together. The first and second rotatable parts may be said to be touching each other.

The first and second joining mechanisms may be said to be separate and/or independent of each other.

The interlocking feature may comprise a first interlocking element provided on the first rotatable part. The interlocking feature may comprise a second interlocking element provided on the second rotatable part. The first and second interlocking elements may be said to corresponding and/or complimentary interlocking elements. The first and second interlocking elements may be engaged with each other. This engagement may provide resistance to axial movement.

The method of fixing a first rotatable part and a second rotatable part of a gas turbine engine together may comprise heating or cooling at least a part of one of the first and second rotatable parts (for example one of their respective interlocking elements) relative to at least a part of the other rotatable part so as to allow them to be interlocked. Such relative heating and/or cooling (which may be referred to as artificial heating and/or cooling, for example using external apparatus such as a heater or a cooler) may result in a temporary change in dimensions of the parts, thereby allowing assembly. After assembly, the heating and/or cooling may be stopped, such the parts return to their original dimensions. Such assembly may allow the interlocking to be an interference fit.

The first interlocking element may be provided by an engagement surface of the first rotatable part. The engagement surface may extend substantially perpendicularly to the radial direction (for example, substantially in an axially-circumferentially extending surface). The second interlocking element may be provided by an engagement surface of the second rotatable part. The engagement surface may extend substantially perpendicularly to the radial direction (for example, substantially in an axially-circumferentially extending surface). The engagement surface of the second rotatable part may engage the engagement surface of the first rotatable part. The engagement surfaces of the first and second rotatable parts may be said to have substantially the same size and/or shape.

Where the interlocking elements are said to be provided by an engagement surface, this may mean that the engagement surface itself is the interlocking element and/or that the engagement surface comprises features that form the interlocking element.

Where an engagement surface is said to extend substantially perpendicularly to the radial direction, this includes surfaces that are perpendicular to a direction that is inclined to the radial direction. For example, it includes surfaces that are perpendicular to a direction that is inclined towards the axial direction from the radial direction by in the range of from 0 to 10 degrees, for example 0.1 degrees to 5 degrees, for example 0.2 degree to 4 degrees, for example 0.5 degrees to 3 degrees, for example 1 degree to 2 degrees.

The engagement surfaces of the first and second rotatable parts may be at least a segment of a frusto-cone, for example a full frusto-cone. The axis of the frusto-cone may be the rotational axis of the gas turbine engine. The frusto-cone may be referred to as right frusto-cone.

The cone angle of such a frusto-cone (which may be defined as the angle between the lines formed by a cross-section through the frusto-cone in the axial-radial plane) may be in the range of from 0 to 10 degrees, for example 0.1 degrees to 5 degrees, for example 0.2 degree to 4 degrees, for example 0.5 degrees to 3 degrees, for example 1 degree to 2 degrees.

The engagement surface on the first rotatable part may comprise at least one protrusion that interlocks with at least one corresponding protrusion formed on the engagement surface of the second rotatable part. The engagement surface on the first rotatable part may comprise a plurality of protrusions that interlock with a plurality of corresponding protrusions formed on the engagement surface of the second rotatable part.

The protrusions (which may be referred to as and/or may be surface texture and/or ridges) may be any suitable size and/or shape. For example, each protrusion may have a triangular cross-section and/or may be pyramidal. The protrusions may be, for example, elongate protrusions extending substantially in the circumferential direction.

The or each protrusion may have a base and a tip. The height of the tip above the base may be less than 5 mm, for example less than 2 mm, for example less than 1 mm, for example less than 0.5 mm, for example in the range of from 0.025 mm to 1 mm.

The mechanical fastener may be of any suitable form. For example, the mechanical fastener may be a rivet. By way of further example, the mechanical fastener may comprise a threaded element, such as a bolt. The mechanical fastener may be, for example, a nut and bolt.

At least one (for example both) of first and second rotatable parts may be part of a compressor, for example the highest pressure compressor in the engine. For example, the first and second rotatable parts may be discs that retain (or are integral with, for example in the form of blisks) the blades of a rotor stage of the compressor, for example the highest pressure compressor in the engine.

At least one (for example both) of the first and second rotatable parts may be part of a turbine, for example the highest pressure turbine in the engine. For example, the first and second rotatable parts may be discs that retain (or are integral with, for example in the form of blisks) the blades of a rotor stage of the turbine, for example the highest pressure turbine in the engine.

At least one (for example both) of the first and second rotatable parts may be part of a shaft linking a compressor and a turbine together, for example a shaft linking the highest pressure compressor and the highest pressure turbine.

The highest pressure compressor and the highest pressure turbine may comprise all of the rotor stages that rotate most quickly in the engine during use.

The first and second rotatable parts may be at least a part of neighbouring rotor stages.

At least one of the first and second rotatable parts may be a spigot used to connect the first and second rotatable parts together. Such a spigot may be a part of the first or second rotatable part.

The skilled person will appreciate that except where mutually exclusive, a feature described in relation to any one of the above aspects may be applied to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which:

FIG. 2 is a sectional side view of a core portion of a gas turbine engine;

DETAILED DESCRIPTION OF EMBODIMENTS

Figure 1:
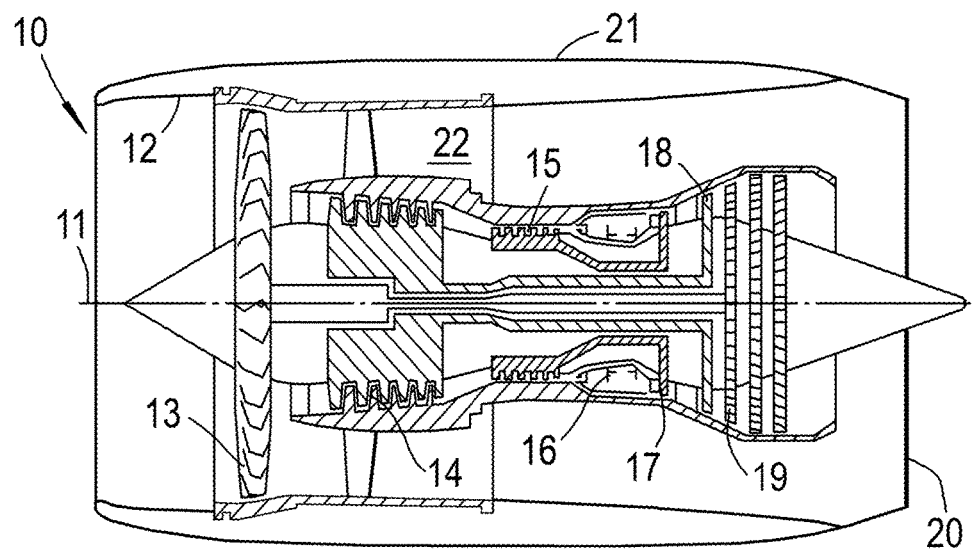
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

FIG. 2 is a close-up view of a part of a high pressure compressor 15, combustor 16 and high pressure turbine 17 of a gas turbine engine 10. The arrow P represents a forward load on the compressor 15 that is generated during use due to the increasing pressure of the fluid as it passes through the compressor 15. Similarly, the arrow Q represents a rearward load on the turbine 17 that is generated during use by the decreasing pressure of the fluid as it passes through the turbine 17.

The compressor 15 comprises multiple rotor stages, as shown in FIG. 2, in which four neighbouring rotor stages are labeled 151, 152, 153, 154. The neighbouring rotor stages 151, 152, 153, 154 are manufactured as separate components that are then connected together. Due to the increasing pressure of the fluid as it passes through the compressor, the joints between the rotor stages experience a tensile loading, labeled T in the Figures. Such a tensile axial load T may occur anywhere in the load path where two components are connected together. For example, a tensile axial load T is shown in FIG. 2 at a joint between two parts of a connecting shaft 30 that connects the compressor 15 to the turbine 17. Although not shown explicitly in FIG. 2, similar joints experiencing a tensile axial load may also be found in the turbine 17, for example.

Figure 3:
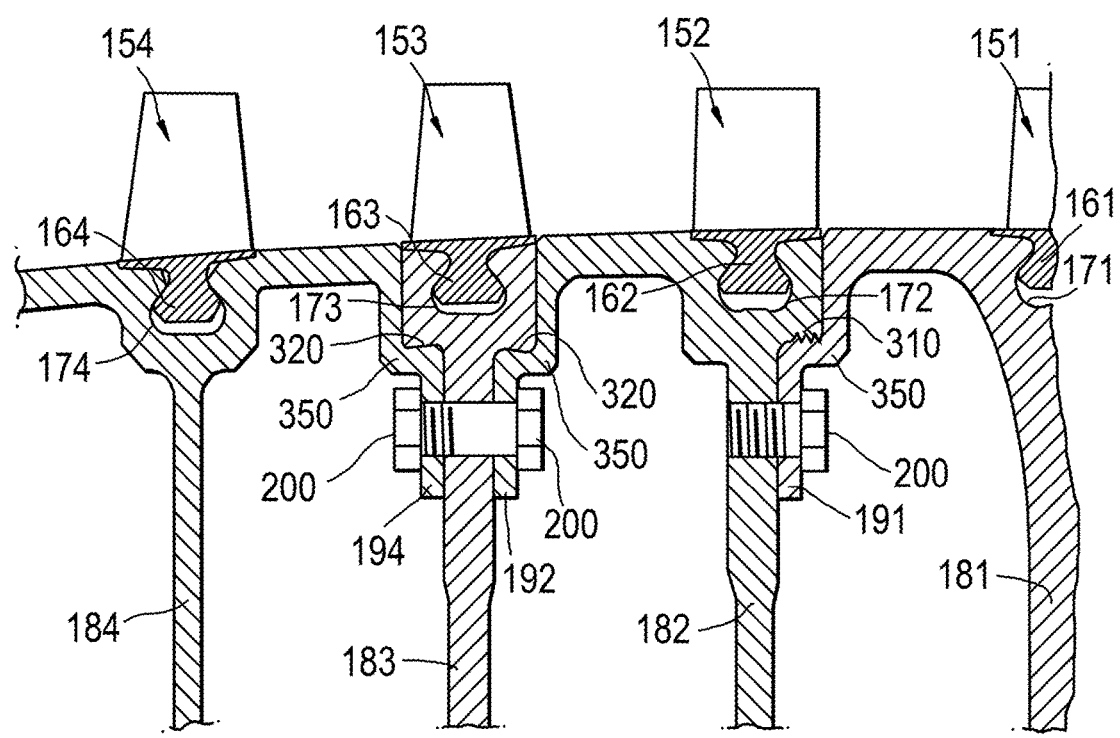
FIG. 3 is a sectional side view of part of a compressor of a gas turbine engine.

FIG. 3 is a more detailed view of four neighbouring rotor stages 151, 152, 153, 154. Typically, stator vanes are provided between each pair of rotor stages 151, 152, 153, 154, but these are not included in FIG. 2 purely for clarity. In the FIG. 3 example, each rotor stage is connected to its neighbouring rotor stage. Each rotor stage is connected to its neighbouring rotor stage by a mechanical fastener 200. Each rotor stage is also connected to its neighbouring rotor stage by an interlocking feature 310, 320.

The mechanical fastener 200 may be a threaded mechanical fastener 200, such as a bolt 200, as in the example shown in FIG. 3.

The interlocking feature 310, 320 may be said to lock one of the rotor stages 151, 152, 153, 154 to a neighbouring rotor stage 151, 152, 153, 154, for example in the axial direction 11. The FIG. 3 arrangement shows two examples of interlocking features 310, 320. One example of an interlocking feature 310 comprises a plurality of protrusions that interlock with another plurality of protrusions, and is described in greater detail below in relation to FIG. 5. Another example of an interlocking feature 320 comprises a pair of engaging frusto-conical surfaces, and is described in greater detail below in relation to FIG. 4. It will be appreciated that an engine may comprise one or both of the interlocking features 310, 320 shown and described in relation to FIGS. 3 to 5, or indeed another type of interlocking feature in accordance with the present disclosure. The rotor stages 151, 152, 153, 154 may be examples of rotatable parts that may be fixed together according to the present disclosure.

The rotor stages 151, 152, 153, 154 shown in the Figures comprise blades secured by a dovetail root 161, 162, 163, 164 into a slot 171, 172, 173, 174. The slot may be formed in or otherwise provided to a disc 181, 182, 183, 184. However, the rotor stages 151, 152, 153, 154 could take any form, for example bladed discs (in which the disc and blades are integral, also known as blisks) and bladed rings (in which the blades extend from, and are integral with, a ring, also known as a bling).

The rotor stages may comprise spigots 191, 192, 194, as in the FIG. 3 example. The spigots 191, 192, 194 may extend from a rotor stage 151, 152, 153, 154 (for example from the disc of a rotor stage) to a neighbouring rotor stage 151, 152, 153, 154. A spigot 191, 192, 194 of one rotor stage 151, 152, 153, 154 may be connected to a neighbouring rotor stage 151, 152, 153, 154, for example using both a mechanical fastener 200 and an interlocking feature 310, 320. For example, a spigot 191, 192, 194 of one rotor stage 151, 152, 153, 154 may be connected to a disc 181, 182, 183, 184 of another rotor stage.

Figure 4:
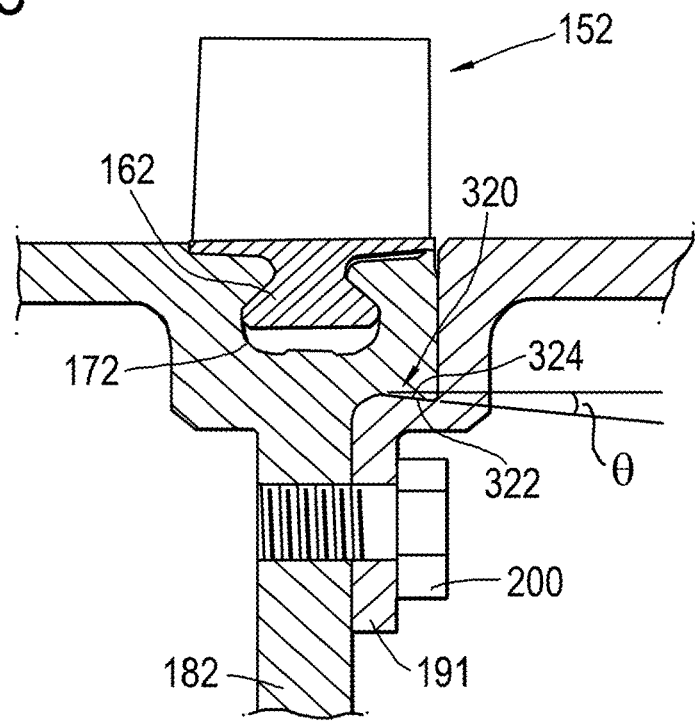
FIG. 4 is a sectional side view of a first example of rotational parts of a gas turbine engine.

FIG. 4 shows an example of an interlocking feature 320 in detail. The FIG. 4 example shows the joint between the rotor stage labeled 151 in FIG. 3 and the stage labeled 152 in FIG. 3, but of course the interlocking feature could be applied to the joint between any rotor stages 151, 152, 153, 154 or indeed the joint/connection between any rotatable parts.

The interlocking feature 320 in the FIG. 4 example is formed by the engagement of two conical surfaces 322, 324. The engaging surfaces may be referred to a frusto-cones. One of the conical surfaces 322 is on the first rotatable part (in the FIG. 4 example the spigot 191 of the first rotor stage 151) and may be referred to as a first interlocking element. The other conical surface 324 is provided on the second rotatable part (in the FIG. 4 example the portion of the slot 172/disc 182 of the second rotatable part 152) and may be referred to as a second interlocking element.

The conical surfaces 322, 324 may be parallel and/or may be substantially the same size and/or shape, at least over an engagement portion thereof. The angle θ of the conical surfaces relative to the axial direction in a plane perpendicular to the circumferential direction may be less than 10 degrees, for example in the range of from 0.1 degrees to 5 degrees, for example in the range of from 0.5 degrees to 3 degrees, for example in the range of from 1 degrees to 2 degrees, for example on the order of 1.5 degrees.

The conical/angled surfaces 322, 324 may be perpendicular to a direction that is angle relative to the radial direction either towards the positive or negative axial direction.

The conical/angled surfaces 322, 324 may help to prevent movement of the first rotatable part 151 relative to the second rotatable part 152, for example relative axial movement (in the direction of the engine axis 11) during use.

Figure 5:
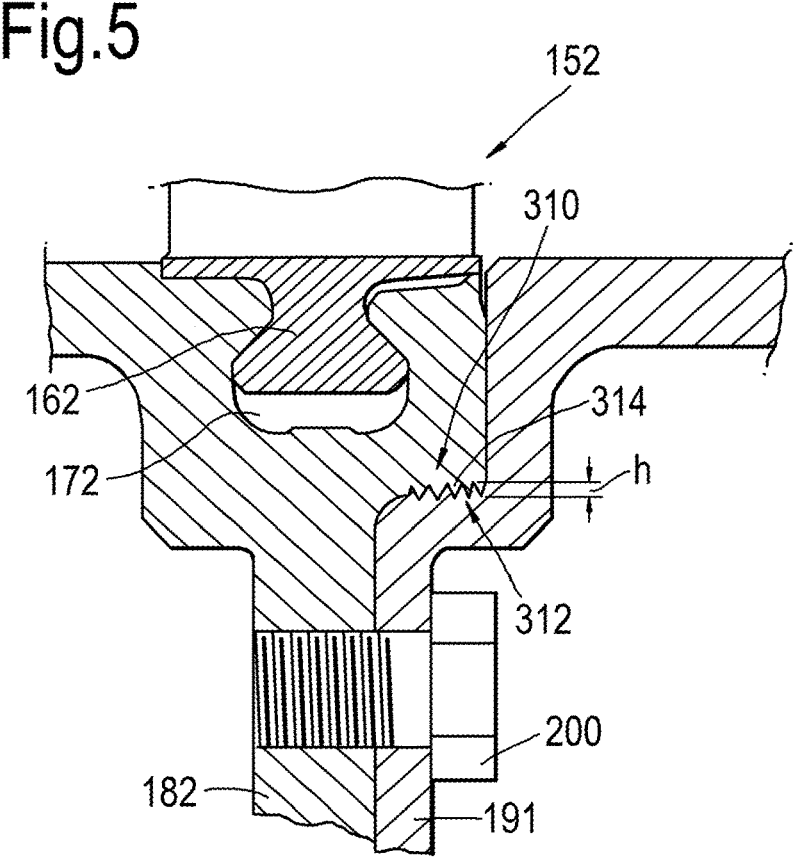
FIG. 5 is a sectional side view of a second example of rotational parts of a gas turbine engine.

FIG. 5 shows an example of an alternative interlocking feature 310 in detail, once again illustrated by way of example using the joint between the rotor stage labeled 151 in FIG. 3 and the stage labeled 152 in FIG. 3. As with the FIG. 4 example, the interlocking feature could be applied to the joint between any rotor stages 151, 152, 153, 154 or indeed the joint/connection between any rotatable parts.

The interlocking feature 310 is formed by a plurality of protrusions 312 formed on an engagement surface of the first rotatable part (in the FIG. 5 example the spigot 191 of the first rotor stage 151) engaging with a plurality of corresponding protrusions 314 formed on an engagement surface of the second rotatable part (in the FIG. 5 example the portion of the slot 172/disc 182 of the second rotatable part 152). The plurality of protrusions 312 formed on an engagement surface of the first rotatable part 151 may be referred to as a first interlocking element. The plurality of protrusions 314 formed on an engagement surface of the second rotatable part 152 may be referred to as a second interlocking element.

The protrusions 312, 314 may extend at least in the circumferential direction (in other words, may have an elongate shape having a longitudinal axis extending at least in part in the circumferential direction), as in the FIG. 5 example.

The protrusions 312, 314 may take any suitable form. For example, the protrusions may have a substantially triangular cross-section, as in the FIG. 5 example, although any other suitable cross-section may also be used. The protrusions may be of any suitable size, for example height h, depending on, for example, the desired resistance to axial movement. Purely by way of example, the height h (which may be referred to as the height in the axial direction) may be less than 5 mm, for example less than 2 mm, for example less than 1 mm, for example less than 0.5 mm, for example in the range of from 0.025 mm to 1 mm. The protrusions 312, 314 may take the form of a regular, repeating pattern, or may be irregularly spaced, for example randomly (or pseudo-randomly) spaced, for example in the form of surface roughness.

In general an interlocking feature may be formed by corresponding interlocking elements formed on the first and second rotatable parts. Corresponding interlocking elements may mean that the elements have the same form, for example the same size and/or shape.

Any suitable method may be used to assemble the first and second rotatable parts 151, 152. For example, one of the first and second rotatable parts (or at least the parts thereof forming the interlocking feature, such as the conical surfaces 322, 324 and/or the protrusions 312, 314) may be heated relative to the other of the first and second rotatable parts. For example, one of the first and second rotatable parts 151, 152 may be artificially heated or cooled. Such heating/cooling may result in the relatively cooler component to be relatively smaller than in use, thereby allowing assembly. Once any artificial heating/cooling is removed, the desired interlocking feature will be produced, for example through an interference fit.

According to any aspect of the disclosure, the second joining mechanism, whatever form that takes, may extend around the full circumference or, where appropriate, may extend around one or more segments of the circumference. Purely by way of example, protrusions 312, 314 such as those in the FIG. 5 example may extend entirely around the circumference of the first and second rotatable parts 151, 152, or may extend of one or more circumferential segments.

It will be understood that the invention is not limited to the embodiments above-described and various modifications and improvements can be made without departing from the concepts described herein. Purely by way of example, the first and second rotatable parts 151, 152, 153, 154 are not limited to those shown and/or described herein, and may include any desired first and second rotatable parts with which the present disclosure may be used. By way of further example, the interlocking features shown in described in FIGS. 4 and 5 may be supplement or replaced by alternative interlocking features and/or the interlocking features shown in described in FIGS. 4 and 5 may be provided separately or in combination with each other. Except where mutually exclusive, any of the features may be employed separately or in combination with any other features and the disclosure extends to and includes all combinations and sub-combinations of one or more features described herein.

I claim:

1. A gas turbine engine having a first rotatable part and a second rotatable part, each of the first and second rotatable parts being rotatable about a rotational axis, wherein:
    the first rotatable part and the second rotatable part are fixed together so as to be fixed relative to each other using a primary joining mechanism and a secondary joining mechanism;
    the primary joining mechanism is a mechanical fastener;
    the secondary joining mechanism is an interlocking feature through which the first and second rotatable parts are engaged so as to resist relative axial movement of the first and second rotatable parts, the interlocking feature comprising a first interlocking element provided on the first rotatable part and a second interlocking element provided on the second rotatable part, the first and second interlocking elements being engaged with each other so as to provide the resistance to axial movement;
    the first interlocking element is provided by an engagement surface of the first rotatable part that extends substantially perpendicularly to a radial direction;
    the second interlocking element is provided by an engagement surface of the second rotatable part that extends substantially perpendicularly to the radial direction and engages the engagement surface of the first rotatable part; and
    the engagement surfaces of the first and second rotatable parts are at least a segment of a frusto-cone, with an axis of the frusto-cone being the rotational axis of the gas turbine engine.

2. A gas turbine engine according to claim 1, wherein the engagement surfaces are perpendicular to a direction that is inclined towards the axial direction from the radial direction by in the range of from 0 to 5 degrees.

3. A gas turbine engine according to claim 1, wherein the mechanical fastener comprises a threaded element.

4. A gas turbine engine according to claim 1, wherein the first and second rotatable parts are part of a highest pressure compressor in the engine, a highest pressure turbine in the engine, and/or a shaft linking the highest pressure compressor and the highest pressure turbine together.

5. A gas turbine engine according to claim 1, wherein the first and second rotatable parts are at least a part of neighbouring rotor stages.

6. A gas turbine engine according to claim 5, wherein at least one of the first and second rotatable parts is a spigot used to connect the first and second rotatable parts together.

7. A gas turbine engine having a first rotatable part and a second rotatable part, each of the first and second rotatable parts being rotatable about a rotational axis, wherein:
    the first rotatable part and the second rotatable part are fixed together so as to be fixed relative to each other using a primary joining mechanism and a secondary joining mechanism;
    the primary joining mechanism is a mechanical fastener;
    the secondary joining mechanism is an interlocking feature through which the first and second rotatable parts are engaged so as to resist relative axial movement of the first and second rotatable parts, the interlocking feature comprising a first interlocking element provided on the first rotatable part and a second interlocking element provided on the second rotatable part, the first and second interlocking elements being engaged with each other so as to provide the resistance to axial movement;

the first interlocking element is provided by an engagement surface of the first rotatable part that extends substantially perpendicularly to the radial direction;

the second interlocking element is provided by an engagement surface of the second rotatable part that extends substantially perpendicularly to the radial direction and engages the engagement surface of the first rotatable part; and the engagement surface of the first rotatable part comprises at least one protrusion that interlocks with at least one corresponding protrusion formed on the engagement surface of the second rotatable part.

8. A gas turbine engine according to claim 7, wherein the engagement surface of the first rotatable part comprises a plurality of protrusions that interlock with a plurality of corresponding protrusions formed on the engagement surface of the second rotatable part.

9. A gas turbine engine according to claim 8, wherein at least one of the plurality of protrusions formed on the engagement surface of the first rotatable part is located within a recess formed between adjacent ones of the plurality of corresponding protrusions formed on the engagement surface of the second rotatable part.

10. A gas turbine engine according to claim 7, wherein the or each protrusion has a base and a tip, the height of the tip above the base being less than 1 mm.

11. A method of fixing a first rotatable part and a second rotatable part of a gas turbine engine together, comprising:

mechanically fastening the first and second rotatable parts together using a mechanical fastener; and interlocking a first interlocking element provided on the first rotatable part with a corresponding second interlocking element provided on the second rotatable part, the first and second interlocking elements being engaged with each other so as to provide resistance to axial movement, wherein:

the first interlocking element is provided by an engagement surface of the first rotatable part that extends substantially perpendicularly to a radial direction;

the second interlocking element is provided by an engagement surface of the second rotatable part that extends substantially perpendicularly to the radial direction and engages the engagement surface of the first rotatable part; and either:
  (1) the engagement surfaces of the first and second rotatable parts are at least a segment of a frusto-cone, with an axis of the frusto-cone being the rotational axis of the gas turbine engine; or
  (2) the engagement surface of the first rotatable part comprises at least one protrusion that interlocks with at least one corresponding protrusion formed on the engagement surface of the second rotatable part.

12. A method of fixing a first rotatable part and a second rotatable part of a gas turbine engine together according to claim 11, comprising heating or cooling one of the interlocking elements relative to the other interlocking element so as to allow them to be interlocked.

13. A method of manufacturing a gas turbine engine comprising the step of fixing the first and second rotatable parts together using the method of claim 11.

* * * * *